(12) United States Patent
Alanara

(10) Patent No.: US 6,212,375 B1
(45) Date of Patent: *Apr. 3, 2001

(54) METHOD AND APPARATUS PROVIDING RESIDENTIAL BASE CARRIER INACTIVATION AFTER LINE FAILURE OR LINE IN USE

(75) Inventor: Seppo M Alanara, Oulu (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/856,769

(22) Filed: May 15, 1997

(51) Int. Cl.$^7$ .................................................. H04Q 7/20
(52) U.S. Cl. .................................... 455/423; 455/445
(58) Field of Search ................................ 455/421, 422, 455/423, 424, 425, 435, 450, 517, 574, 8, 426, 448, 552, 553, 445

(56) References Cited

U.S. PATENT DOCUMENTS

| | | | |
|---|---|---|---|
| 5,173,927 | | 12/1992 | Strommer et al. ............... 375/81 |
| 5,309,502 | * | 5/1994 | Hirai ............................... 455/426 |
| 5,373,548 | * | 12/1994 | McCarthy ........................ 455/421 |
| 5,428,818 | * | 6/1995 | Meidan et al. .................... 455/63 |
| 5,551,056 | * | 8/1996 | Koponen et al. ................ 455/423 |
| 5,751,789 | * | 5/1998 | Farris et al. .................... 455/554 |
| 5,805,666 | * | 9/1998 | Ishizuka et al. ................. 455/423 |
| 5,812,636 | * | 9/1998 | Tseng et al. .................... 455/423 |

FOREIGN PATENT DOCUMENTS

| | | | |
|---|---|---|---|
| 2-65415 | * | 3/1990 | (JP) ................................. 455/343 |
| WO 93/16560 | | 8/1993 | (WO) . |

OTHER PUBLICATIONS

TR45, Mobile Station–Land Station Compatibility Specification for Analog Cellular Auxiliary Personal Communications Service (PN–3165), Dec. 14, 1993.

* cited by examiner

Primary Examiner—Reinhard Eisenzopf
Assistant Examiner—Sam Bhattacharya
(74) Attorney, Agent, or Firm—Perman & Green, LLP

(57) ABSTRACT

A personal base station (38) includes a transceiver (38b,38c) coupled to an antenna (38d) for conducting bidirectional wireless communications with a mobile station (10); an interface (38g) to a telephone line; and a controller (38a) that includes a circuit (38f) for sensing that the telephone line is not available for use. The controller is responsive to the telephone line not being available for use for notifying a mobile station that the mobile station is to register with a cellular communication system (32). In a preferred embodiment of this invention the sensing circuit is operable to discriminate between a disconnection of the telephone line and the use of the telephone line. In the first case the disconnect message may be sent immediately, while in the latter case the disconnect message may be sent after some predetermined time delay. In one embodiment the controller formats and transmits a message to the mobile station for notifying the mobile station that the mobile station is to register with the cellular communication system, while in another embodiment the controller terminates a transmission of an RF carrier signal to the mobile station for notifying the mobile station that the mobile station is to register with the cellular communication system. Methods for operating the personal base station are also disclosed.

2 Claims, 3 Drawing Sheets

METHOD AND APPARATUS PROVIDING RESIDENTIAL BASE CARRIER INACTIVATION AFTER LINE FAILURE OR LINE IN USE

FIELD OF THE INVENTION

This invention relates generally to radiotelephones and, in particular, to radiotelephones or mobile stations such as those capable of operation with a cellular network and also with a residential or personal base station.

BACKGROUND OF THE INVENTION

In some modern wireless communications systems a mobile station, such as a cellular telephone or wireless communicator, is enable to operate in two frequency bands. In a first frequency band the mobile station is able to make and receive calls through a conventional cellular network having base stations and a mobile switching network. In a second frequency band the mobile station is able to make and receive calls through a local or residential base station, also sometimes referred to as a personal base station. By example, when entering a building (such as a residence or an office) having a personal base station the mobile station automatically switches from the first frequency band to the second frequency band. Appropriate signalling and message formats are used to inform the telephone network that any calls to the mobile station should be routed to a telephone number associated with the personal base station. If an incoming call arrives the personal base station pages the mobile station over a paging channel and thereafter sets up the required voice channel, with the paging and voice channels both being in the second frequency band.

A problem that exists in presently specified systems relates to the occurrence of a failure of the primary power to personal base station, and/or an incoming telephone line failure. By example, as presently specified the personal base station is required to delay for some period of time (e.g., 15 minutes) after an occurrence of a line failure before terminating the RF carrier. As can be appreciated, during this time the mobile station may miss any incoming paging messages and, thus, may not receive an important incoming call.

Another problem that is not adequately addressed in currently implemented or proposed systems relates to the case where a conventional residential telephone shares the telephone line with the personal base station. If the residential telephone is in use, a call to the associated telephone number that is intended for the mobile station will receive a busy signal.

OBJECTS OF THE INVENTION

It is thus a first object of this invention to provide an improved method for operating a personal base station in conjunction with a mobile station that overcomes the foregoing and other problems.

It is another object of this invention to provide an improved personal base station that overcomes the foregoing and other problems.

SUMMARY OF THE INVENTION

The foregoing and other problems are overcome and the objects of the invention are realized by methods and apparatus in accordance with embodiments of this invention. In accordance with the teaching of this invention a personal base station includes a transceiver coupled to an antenna for conducting bidirectional wireless communications with a mobile station; an interface to a telephone line; and a controller that includes a circuit for sensing that the telephone line is not available for use. The controller is responsive to the telephone line not being available for use for notifying a mobile station that the mobile station is to obtain service from a public cellular communication system. This may typically require the mobile station to register with the public cellular communication system using a system-specified messaging protocol.

In a preferred embodiment of this invention the sensing circuit is operable to discriminate between a disconnection of the telephone line and the use of the telephone line. In the first case the disconnect message may be sent immediately, while in the latter case the disconnect message may be sent after some predetermined time delay.

In one embodiment the controller formats and transmits a message to the mobile station for notifying the mobile station that the mobile station is to register with the cellular communication system, while in another embodiment the controller immediately terminates a transmission of an RF carrier signal to the mobile station for notifying the mobile station that the mobile station is to register with the cellular communication system.

Methods for operating the personal base station are also disclosed.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
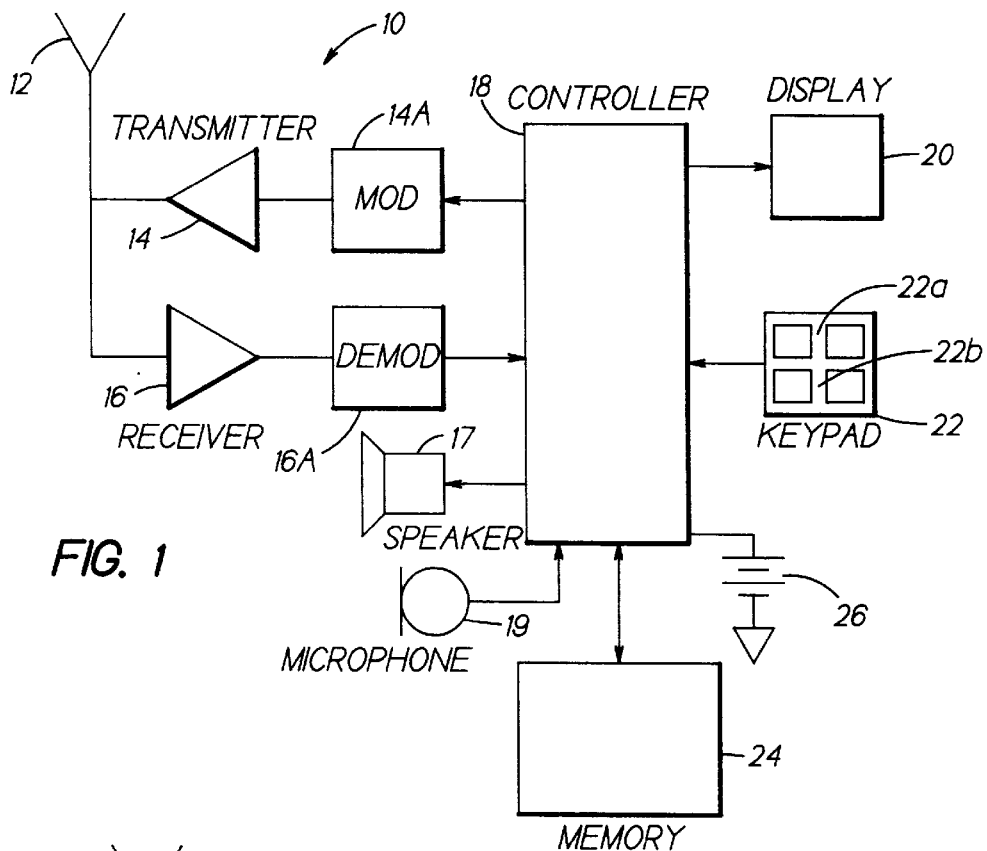
FIG. 1 is a block diagram of a mobile station that is suitable for use in implementing this invention.
Figure 2:
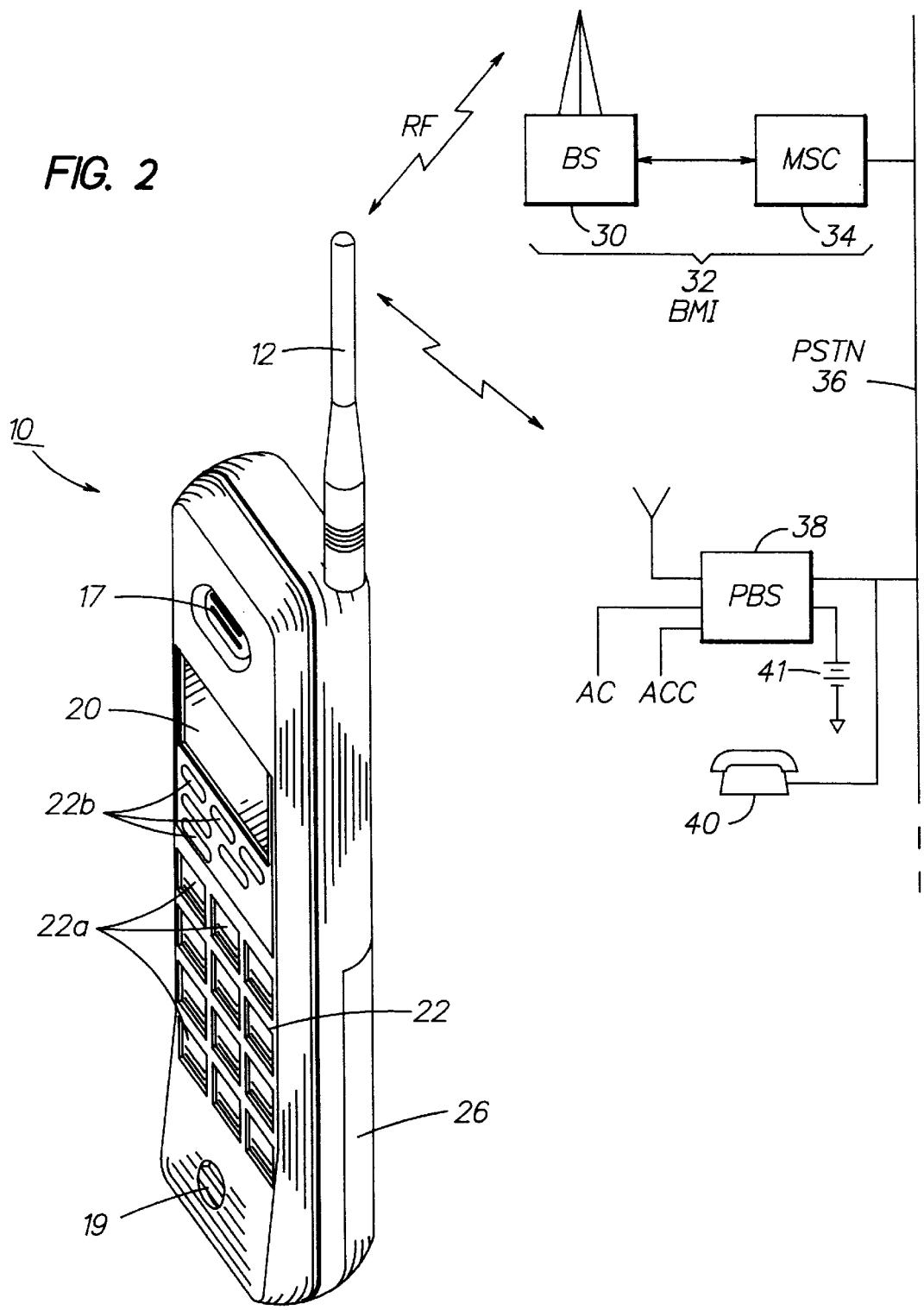
FIG. 2 is an elevational view of the mobile station shown in FIG. 1, and which further illustrates a public cellular communication system to which the mobile station is bidirectionally coupled through first wireless RF links, and which also shows a personal base station to which the mobile station is bidirectionally coupled through second wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a public cellular network comprising a Base Station/Mobile Switching Center/Interworking function (BMI) 32 that includes a mobile switching center (MSC) 34. The MSC 34 provides a connection to landline trunks such as the Public Switched Telephone Network (PSTN) 36 when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be appreciated that the mobile station 10 can be capable of operating with one or more air interface standards, modulation types, and access types. By example, the mobile station may be capable of operating with any of a number of standards such as IS-136, GSM and IS-95. Narrow-band AMPS (NAMPS), as well as TACS, mobile stations may also benefit from the teaching of this invention, as should dual or higher mode phones (e.g., digital/analog or TDMA/CDMA/analog phones). It should thus be clear that the teaching of this invention is not to be construed to be limited to any one particular type of mobile station or air interface standard.

In the preferred embodiment of the invention the mobile station 10 is also capable of operating with a personal base station (PBS) 38 when in range of the PBS 38. Operation may occur in a second band of frequencies that do not overlap the first band of frequencies used for communication with the base station 30, or in the same or an overlapping band of frequencies. The PBS 38 is also connected to the PSTN 36 such that a call directed to the mobile station 10, after the mobile station 10 has registered with the PBS 38, will be directed to the PBS 38 for wireless connection to the mobile station 10. One or more mobile stations 10 can be serviced by the PBS 38.

Also shown in FIG. 2 is a capability to connect one or more conventional telephone sets 40 to the incoming telephone line to the PBS 38.

The PBS 38 is typically connected to the local power mains (shown as AC and ACC), and may include a battery 41 for providing temporary operating power in the event of a power loss or failure.

Figure 3:
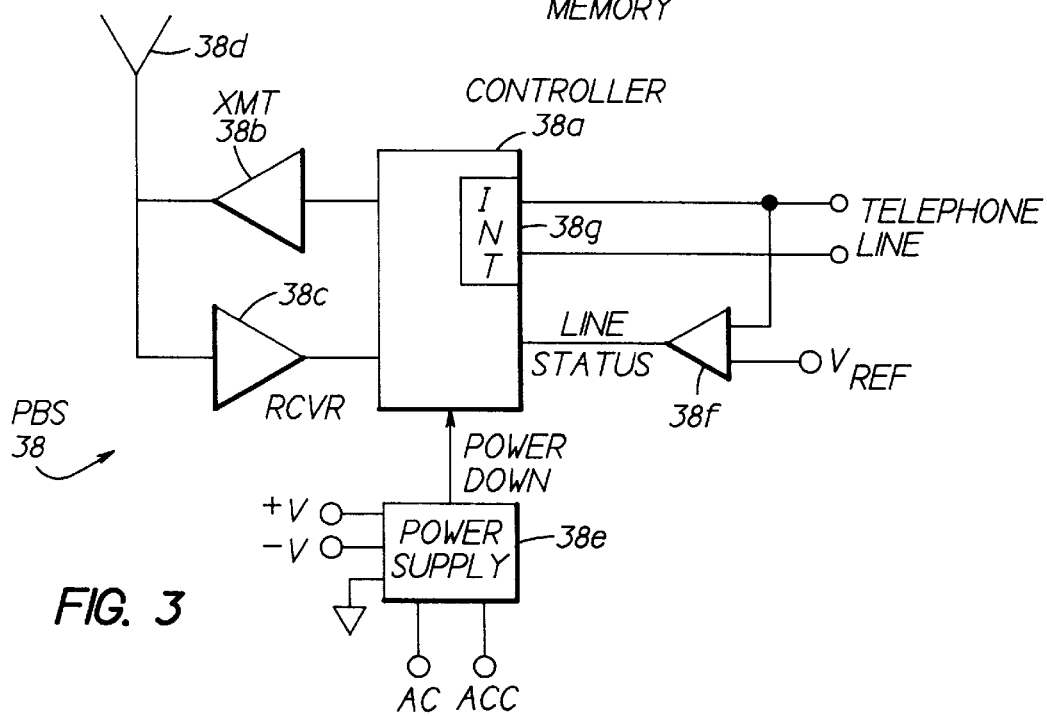
FIG. 3 is block diagram of the personal base station of FIG. 2.

Referring to FIG. 3, the PBS 38 includes a controller 38a, such as a microprocessor and/or a digital signal processor, and a transceiver comprised of a transmitter 38b, a receiver 38c and an antenna 38d for communicating with the mobile station 10. The PBS 38 also includes a power supply 38e connected to the AC mains for providing the required DC operating voltages (shown as +V and −V). In this embodiment the power supply 38e generates a conventional power loss or power down signal which is applied to the controller 38a to indicate a loss of AC power. The power down signal can be connected to an interrupt input of the controller 38a or may be connected to an input port for periodic sampling by the controller 38a. Controller 38a is also connected, through a suitable interface circuit (INT) 38g to the incoming telephone line. A circuit such as a comparator 38f can also be connected to the telephone line for providing a line status signal to the controller 38a. In this case, a reference voltage ($V_{REF}$) is also connected to the comparator 38f. By example, when the voltage potential on the telephone line drops below the reference voltage, the line status signal is asserted to the controller 38a. Depending on the magnitude of the reference voltage, the line status signal can indicate either that the telephone line is disconnected or, for the case where the conventional telephone 40 is connected, that the conventional telephone 40 is off-hook and that the telephone line is in use.

It is also within the scope of this invention for the controller 38a to periodically verify the operation of the controlling telephone switch that is connected to the telephone line. If the controlling switch is found to be non-functional, then the disconnect message is sent, preferably immediately, to the mobile station 10. The controller 38a can verify the operation of the switch by periodically generating an off-hook condition, and then detecting the presence of a dial tone from the switch. If the dial tone is received, it is assumed that the switch is functional, and the controller 38a then generates the on-hook condition.

Figure 4:
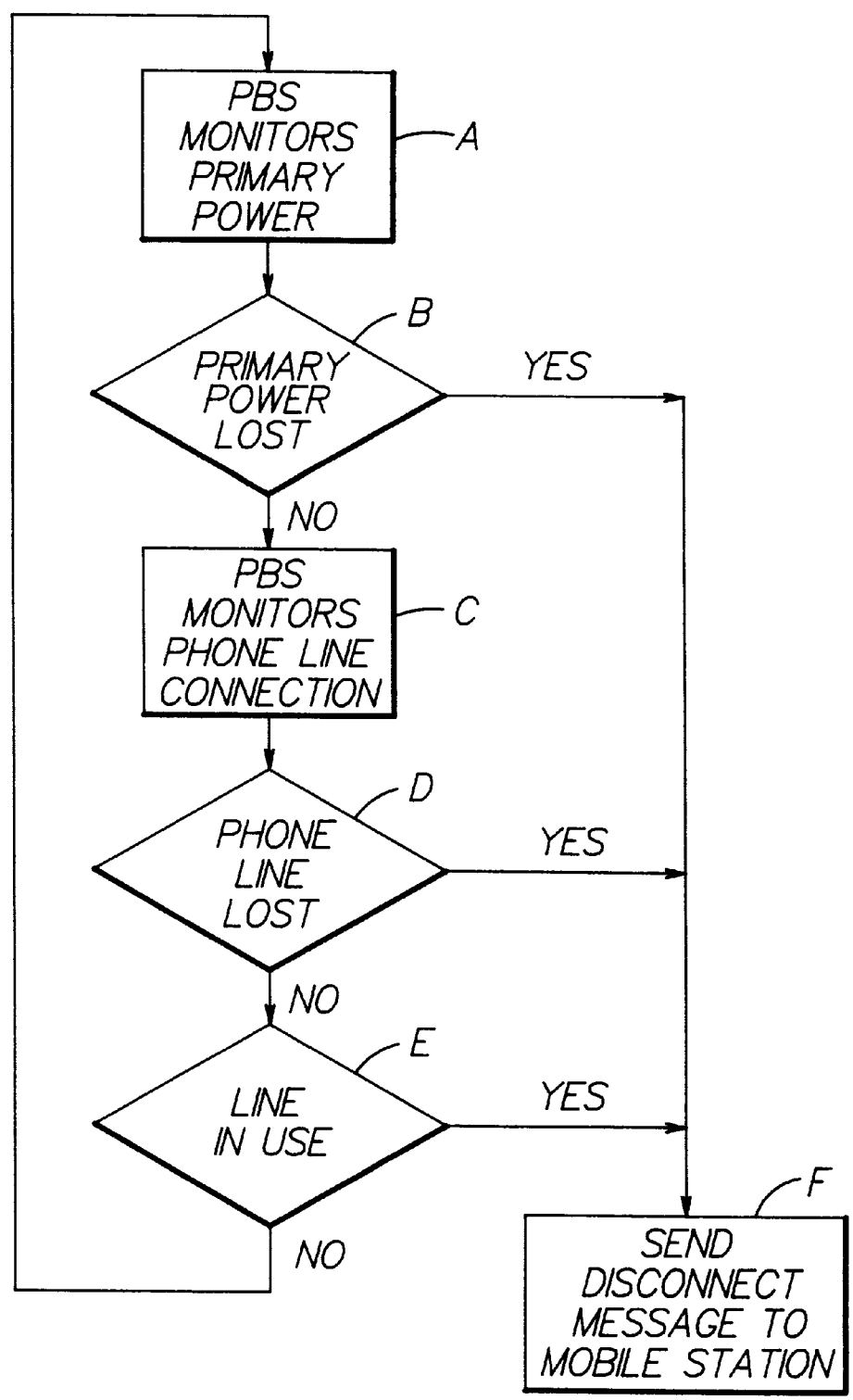
FIG. 4 is a logic flow diagram that illustrates a method executed by the personal base station of FIG. 3.

Referring now to FIG. 4, the controller 38a of FIG. 3 operates in a loop to monitor power and the telephone line status. At Block A the PBS 38 monitors the primary power as indicated by, for example, the state of the power down signal. At Block B a determination is made if the primary power is lost. If yes, and for a case where the controller 38a does not have adequate battery backup or has been operating for some period of time using the battery backup, control passes to Block F wherein, in accordance with this invention, the PBS 38 sends a message to the mobile station 10 to disconnect from the PBS 38 and register with the base station 30 of the serving cellular network. If no at Block B, control passes to Block C where the PBS 38 monitors the phone line connection as indicated by the line status signal output from the comparator 38f (and/or by detecting the dial tone while temporarily going off-hook). At Block D the PBS 38 determines if the phone line is disconnected or otherwise non-functional. If yes, control passes to Block F to send the disconnect message to the mobile station 10. The message may be sent immediately or after some delay. Immediately sending the disconnect message or indication, in the context of this invention, implies that the message or indication is sent without any preprogrammed delay. For the case where the controller 38a is able to discriminate between the phone line being disconnected and the use of the phone line by the attached telephone 40, a separate determination is made at Block E if the phone line is in use. If yes, the PBS 38 sends the disconnect message to the mobile station. Assuming that the determinations at Blocks D and E are both no, control passes back to Block A to continue monitoring the primary power and the state of the phone line.

It can be appreciated that the method described in FIG. 4 eliminates the possibility that the mobile station 10 may miss an incoming call during a time that the PBS 38 is unpowered or when the incoming telephone line is not available for use.

Having registered with the base station 30, any incoming calls to the mobile station 10 will be routed by the MSC 34 through the base station 30, and not through the PBS 38.

It is within the scope of this invention for the mobile station 10 to periodically attempt to register with the PBS 38 after it has been instructed to deregister and register with the BMI 32. In this manner the mobile station 10 is enabled to once more obtain service through the PBS 38 after the power loss condition or the telephone line unavailability condition has been corrected or no longer exists.

It is also within the scope of this invention for the PBS 38 to delay sending the disconnect message when the determination at Block E of FIG. 4 indicates that the telephone line is in use. By example, having detected that another telephone is using the phone line, the controller 38a may delay for some predetermined period of time (e.g., one minute) and then re-execute Block E. Only if the phone line is still in use does the controller 38a enter Block F to send the message to the mobile station 10 instructing the mobile station to deregister and register instead with the cellular system. The use of the time delay in this case avoids the possibility of causing frequent deregistrations due to short incoming or outgoing phone calls being made to or from the telephone 40.

Although described in the context of preferred embodiments, it should be realized that a number of modifications to these teachings may occur to one skilled in the art. By example, one embodiment of the invention described in Block F of FIG. 4 immediately sends a message to the mobile station 10 to instruct the mobile station to enter the cellular mode. However, this can also be achieved by the PBS 38 terminating the transmission of an RF carrier to the mobile station 10. In this case the mobile station 10 senses the loss of the RF carrier, and then automatically sends a registration message to the base station 30. Of course, both techniques could be used (e.g., the PBS 38 sends a specific disconnect message to the mobile station 10, followed by a termination of the transmission of the RF carrier). A subsequent transmission of the RF carrier by the PBS 38 can also be sensed by the mobile station 10 and, assuming that the mobile station 10 is not involved in a call, can result in the mobile station deregistering from the BMI 32 and once more registering with the PBS 38.

Thus, while the invention has been particularly shown and described with respect to preferred embodiments thereof, it will be understood by those skilled in the art that changes in form and details may be made therein without departing from the scope and spirit of the invention.

What is claimed is:

1. A personal base station, comprising:
   a transceiver coupled to an antenna for conducting bidirectional wireless communications with a mobile station, said mobile station also capable of communicating with a cellular communication system;
   an interface to a telephone line;
   a first monitor for sensing the presence of power to the personal base station;
   a controller responsive to the loss of power to the personal base station to notify the mobile station that said mobile station is to obtain service from said cellular communication system; and further comprising:
   a second monitor for sensing the status of the telephone line and determining if said telephone line is disconnected or in use; and
   wherein said controller, responsive to said second monitor, notifies said mobile station that said mobile station is to obtain service from said cellular communication system, when said telephone line is disconnected and, if said telephone line is in use, said controller, notifies said mobile station that said mobile station is to obtain service from said cellular communication system when said telephone line is in use for at least a predetermined period.

2. A mobile communication device for operating both within a local area communication system and within a public cellular communication system, said communication systems connected to a telephone line, comprising:
   a mobile station having a transceiver, coupled to an antenna for conducting bidirectional wireless communications with a personal base station connected to said local area communication system, and a public base station connected to said public cellular communication system, wherein said personal base station further comprises:
   a first monitor for sensing the presence of power to the personal base station;
   a controller responsive to the loss of power to the personal base station to notify the mobile station that said mobile station is to obtain service from said cellular communication system; and
   wherein said mobile station switches from said local area communication system to said public cellular communication system in response to said notification from said controller; and further comprising:
   a second monitor for sensing the status of the telephone line and determining if said telephone line is disconnected or in use; and
   wherein said controller, responsive to said second monitor, notifies said mobile station that said mobile station is to obtain service from said cellular communication system, when said telephone line is disconnected and, if said telephone line is in use, said controller, notifies said mobile station that said mobile station is to obtain service from said cellular communication system when said telephone line is in use for at least a predetermined period.

* * * * *